May 24, 1927.　　　　　P. A. ROSS　　　　　1,630,136
VEGETABLE WASHER
Filed July 21, 1926　　　2 Sheets-Sheet 2
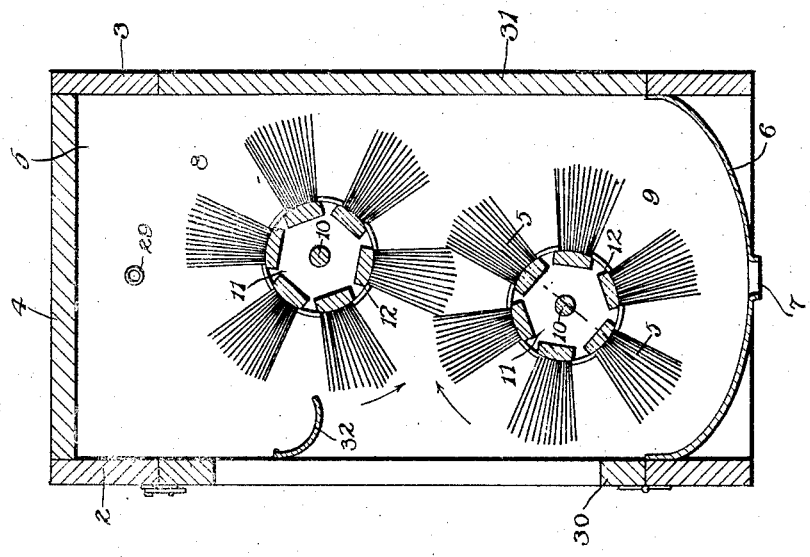
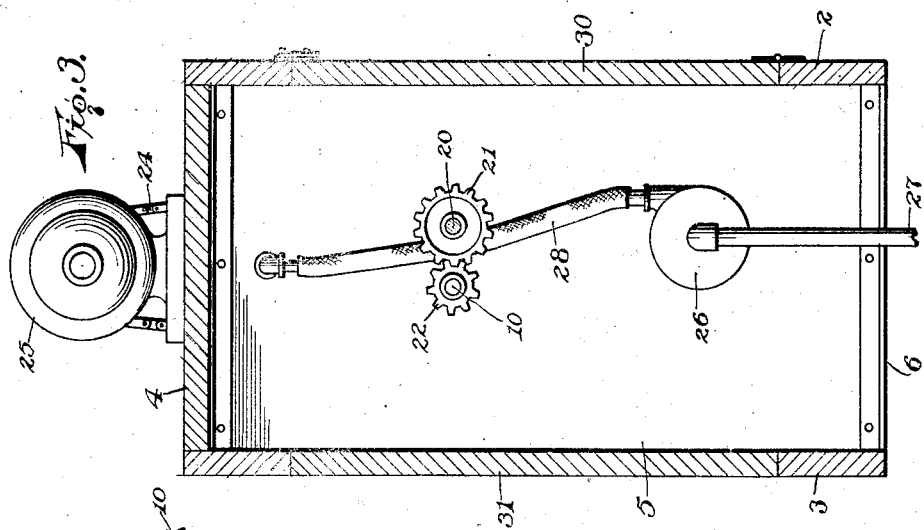
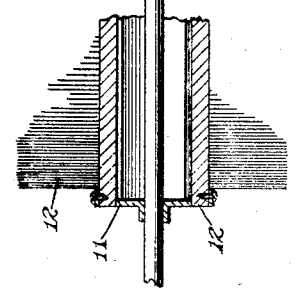
Inventor
P. A. Ross
By Lacey & Lacey, Attorneys Patented May 24, 1927.

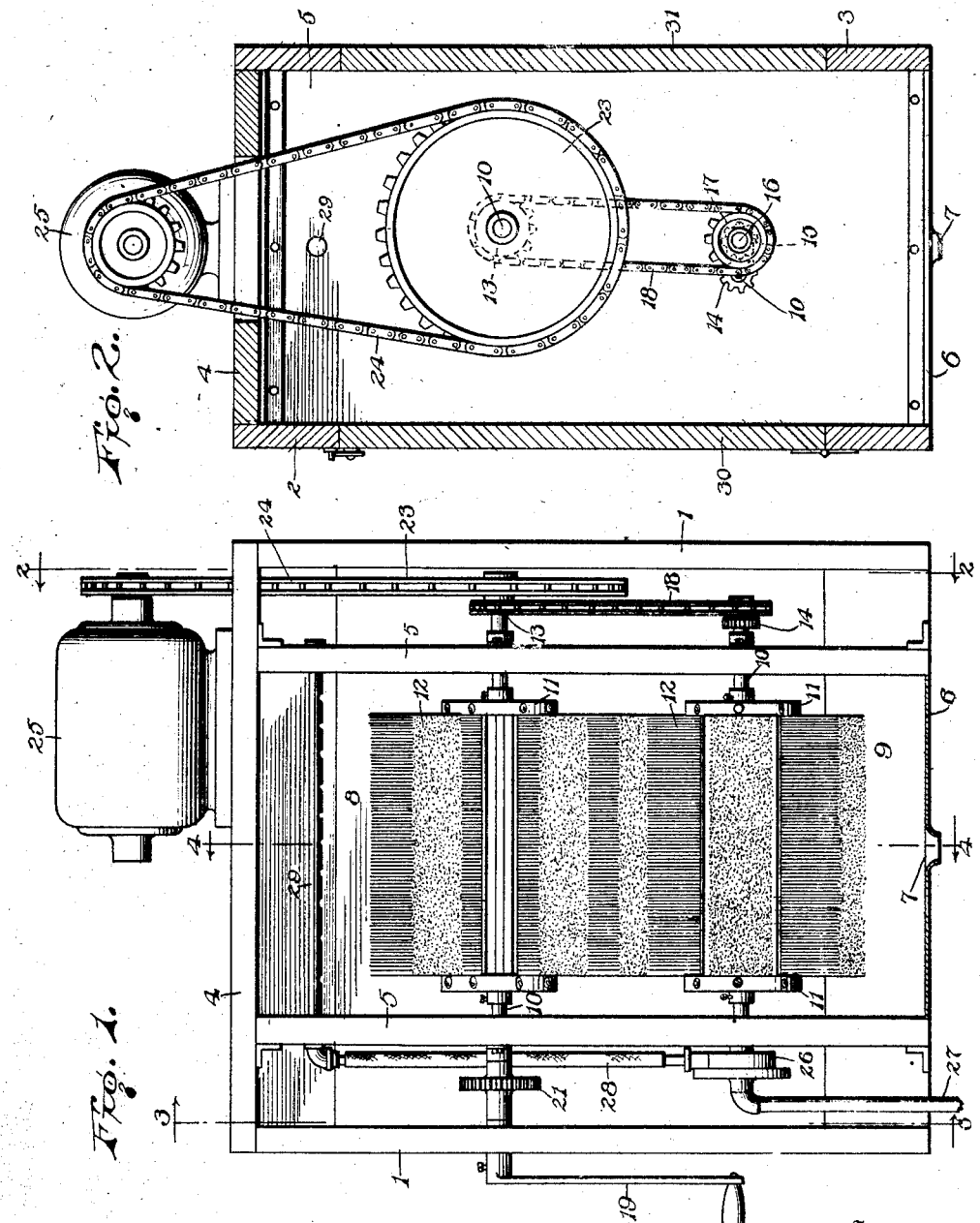

1,630,136

UNITED STATES PATENT OFFICE.

PHILLIP A. ROSS, OF BRADFORD, PENNSYLVANIA.

VEGETABLE WASHER.

Application filed July 21, 1926. Serial No. 124,028.

This invention relates to the preparation of vegetables for market and provides a machine for removing earth from the vegetables and otherwise washing and preparing them for market.

The invention provides a machine which is adapted to be operated by hand or motor including a pair of rotary brushes, means for supplying water to the brushes and a pump for using the water over and over.

The invention further supplies a machine of simple construction, a few number of parts and easily maintained in working condition at a small cost.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which, Figure 1 is a front view of a vegetable washer embodying the invention, the pan in the bottom being in section, and the front omitted, Figure 2 is a vertical sectional view on the line 2—2 of Figure 1, looking in the direction of the arrows, Figure 3 is a sectional view on the line 3—3 of Figure 1 looking to the right, as designated by the arrows, Figure 4 is a sectional view on the line 4—4 of Figure 1, looking to the left, as indicated by the arrows, and Figure 5 is a detail sectional view of an end portion of one of the rotary brushes on the line 5—5 of Fig. 4.

Corresponding and like parts are referred to in the following description and designated in the several views of the drawings by like reference characters.

The apparatus embodies a suitable framework for receiving the working parts and enclosing and protecting the same. As shown, the framework comprises side pieces 1, a front 2, a back 3, and a top 4 which serves to connect the enclosing walls at their upper ends. Uprights 5 are spaced from the sides 1 and are connected at their upper ends to the top 4 and at their vertical edges to the front 2 and the back 3. A metal pan 6 is disposed between the lower ends of the uprights 5 and the front 2 and back 3, and is provided with a centrally disposed outlet 7 for the discharge of the spent water.

Rotary brushes 8 and 9 are disposed within the enclosing frame in vertical position and are adapted to be rotated in reverse directions, so that their opposing portions travel rearwardly, as indicated by the arrows in Figure 4. Each of the rotary brushes comprises a shaft 10, heads 11 secured to opposite end portions of the shaft and a plurality of brushes 12 secured between the heads 11, the latter being formed with openings to receive terminal portions of the brush backs. In this manner the brushes 12 may be readily replaced when worn. The shafts 10 are extended at one end beyond an upright 5. One of the shafts receives a sprocket gear 13. The other shaft receives a spur gear 14 which is fast to the projecting end. The spur gear 14 is in mesh with a spur gear 15 fast to a stub shaft 16 upon which is mounted a sprocket head 17 which is connected by means of a sprocket chain 18 with the sprocket gear 13 fast to the projecting end of the shaft of the upper rotary brush 8. In this manner the rotary brushes 8 and 9 are reversely driven in the manner indicated.

The machine may be driven, either by hand or by motor, as indicated most clearly in Figure 1. To adapt the machine to be operated by hand the crank 19 is secured to the projecting end of a short shaft 20 to which is secured a spur gear 21 which is in mesh with a spur gear 22 fast to a projecting end of the shaft of the upper brush 8. When the machine is adapted to be operated by motor, the power is supplied to the shaft of one of the rotary brushes. As shown, a sprocket gear 23 fast to the shaft of the rotary brush 8 is connected by means of a sprocket chain 24 with the shafts of the motor 25. The motor 25 may be of any type and the same may be conveniently located. When electricity is available, it is preferred to utilize an electric motor, such as indicated.

A pump 26 is associated with the apparatus and enables the same water to be used over and over, or if preferred the pump may draw water from a spring or other source of supply. The pump indicated is of the rotary type and its rotor is fast to the shaft of the lower brush 9. A pipe 27 connects with the casing of the pump 26 and leads to a suitable source of water supply. A pipe 28 connects the pump 26 with a spray pipe 29 disposed in the upper portion of the framework above the upper rotary brush 8 to supply water thereto in jets.

In the general application of an apparatus embodying the invention, the machine is placed upon a barrel, tub, or other receptacle, not shown, adapted to contain a quantity of water, and the pipe 27 is extended into said receptacle to draw the water therefrom and supply the same in jets to the rotary brushes through the instrumentality of the perforated pipe 29. The front of the framework is provided with an opening to which is fitted a door 30 which is hinged at its lower end to swing outwardly and downwardly. The door 30 has an opening formed therein through which the vegetables are introduced and pass between the rotary brushes 8 and 9 to be cleaned thereby. The back of the framework may have a panel 31 removably fitted thereto which, in conjunction with the door 30, admits of ready access to the interior of the framework for any desired purpose. In the operation of the machine the vegetables to be cleaned are passed through the opening provided in the door 30 and are moved so as to come between the opposing portions of the brushes 8 and 9 which operate to remove all dirt and other matter therefrom, the operation being assisted materially by the water supplied to the brushes. The water escaping from the brushes is received upon the pan 6 and passes therefrom through the opening 7 back into the receptacle upon which the apparatus is placed and is used over again in the manner stated. The dirt, being heavy, gravitates to the bottom of the barrel or other receptacle, as will be readily understood. A deflector 32 extends across the upper portion of the opening formed in the door 30 and prevents the upper brush 8 from throwing or splashing water through the opening of the door. The construction is such as to admit of ready adjustment of the brushes when worn or replacement thereof at a nominal cost.

Having thus described the invention, I claim:

1. A vegetable cleaner comprising a framework adapted to be supported upon a receptacle containing water, a cleaner mechanism on the framework, a spray pipe for supplying water to the cleaner mechanism, a pump mounted upon the framework and adapted to draw water from the said receptacle and supply it to the spray pipe, and operating means for both the pump and cleaner mechanism carried by the said framework.

2. A vegetable cleaner comprising a supporting frame, rotary brushes carried thereby, a pipe for delivering water to the frame and brushes, a pump mounted on the frame and adapted to supply the said pipe with water, power transmitting means for the pump and brushes, and a main frame enclosing the supporting frame, brushes, pump and power transmitting means and having openings in its front and back for the passage of the vegetables to be cleaned.

3. A vegetable washer comprising a framework, uprights within the framework spaced from the sides thereof, a pan in the lower portion of the space enclosed by said uprights and the front and back of the framework, and having a centrally disposed outlet, upper and lower brushes mounted in the uprights, a spray pipe mounted in the upper portion of the uprights, a pump disposed in the space formed between an upright and the adjacent side of the framework, and having connection with the spray pipe, gearing connecting the brushes and disposed in the space formed between the other upright and the adjacent side of the framework, and operating means for the pump and brushes.

In testimony whereof I affix my signature.

PHILLIP A. ROSS. [L. S.]